(12) United States Patent
Shiau et al.

(10) Patent No.: US 12,045,385 B2
(45) Date of Patent: Jul. 23, 2024

(54) WEARABLE TRACKING SYSTEM AND WEARABLE TRACKING METHOD

(71) Applicant: HTC Corporation, Taoyuan (TW)

(72) Inventors: Jia-Yau Shiau, Taoyuan (TW); Kuan-Hsun Wang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/178,535

(22) Filed: Mar. 6, 2023

(65) Prior Publication Data
US 2023/0305624 A1    Sep. 28, 2023

Related U.S. Application Data

(60) Provisional application No. 63/322,642, filed on Mar. 23, 2022.

(51) Int. Cl.
| G06F 3/01 | (2006.01) |
| G02B 27/01 | (2006.01) |
| G06T 7/70 | (2017.01) |
| G06V 40/10 | (2022.01) |

(52) U.S. Cl.
CPC .............. *G06F 3/012* (2013.01); *G02B 27/01* (2013.01); *G06F 3/014* (2013.01); *G06T 7/70* (2017.01); *G06V 40/10* (2022.01)

(58) Field of Classification Search
CPC .......... G06F 3/012; G06F 3/014; G06T 7/70; G06V 40/10; G02B 27/01
See application file for complete search history.

(56) References Cited

U.S. PATENT DOCUMENTS

| 2017/0262049 | A1* | 9/2017 | Kim | G06F 3/011 |
| 2020/0128902 | A1* | 4/2020 | Brown | A42B 3/042 |
| 2020/0154131 | A1 | 5/2020 | Iyer et al. | |
| 2020/0294311 | A1* | 9/2020 | Holz | H04N 13/271 |
| 2020/0367970 | A1* | 11/2020 | Qiu | A61B 90/36 |
| 2020/0371584 | A1* | 11/2020 | Zhao | G06F 3/0346 |
| 2021/0283496 | A1* | 9/2021 | Mandella | A63F 13/53 |
| 2022/0066547 | A1 | 3/2022 | Liao et al. | |

FOREIGN PATENT DOCUMENTS

| TW | 201633104 | 9/2016 |
| TW | 202001670 | 1/2020 |

OTHER PUBLICATIONS

"Office Action of Taiwan Counterpart Application", issued on Sep. 12, 2023, p. 1-p. 12.

* cited by examiner

*Primary Examiner* — Afroza Chowdhury
(74) *Attorney, Agent, or Firm* — JCIPRNET

(57) ABSTRACT

A wearable tracking system is provided. The wearable tracking system includes a wearable device, an external camera, and a processor. The wearable device is adapted to be worn on a body part of a user. The wearable device is configured to detect a body movement of the body part based on a tracking sensor. The external camera is configured to obtain a body image of the body part. The processor is configured to obtain a first moving track of a body moving track of the body part based on the body movement, obtain a second moving track of the body moving track of the body part based on the body image, and determine a body pose of the body part based on the first moving track and the second moving track.

18 Claims, 3 Drawing Sheets

WEARABLE TRACKING SYSTEM AND WEARABLE TRACKING METHOD

CROSS-REFERENCE TO RELATED APPLICATION

This application claims the priority benefit of U.S. provisional application Ser. No. 63/322,642, filed on Mar. 23, 2022. The entirety of the above-mentioned patent application is hereby incorporated by reference herein and made a part of this specification.

BACKGROUND

Technical Field

The disclosure relates to a wearable tracking system; particularly, the disclosure relates to a wearable tracking system and a wearable tracking method.

Description of Related Art

In order to bring an immersive experience to user, technologies related to extended reality (XR), such as augmented reality (AR), virtual reality (VR), and mixed reality (MR) are constantly being developed. AR technology allows a user to bring virtual elements to the real world. VR technology allows a user to enter a whole new virtual world to experience a different life. MR technology merges the real world and the virtual world.

To supply the immersive experiences, a wearable device worn by the user is often used for either providing immersive visual content or tracking a position of the user. Therefore, in application of AR, VR, or MR, the convenience and the performance of the wearable device often seriously affect the user experience.

SUMMARY

The disclosure is direct to a wearable tracking system and a wearable tracking method, so as to tracking a user easily.

In this disclosure, a wearable tracking system is provided. The wearable tracking system includes a wearable device, an external camera, and a processor. The wearable device is adapted to be worn on a body part of a user. The wearable device is configured to detect a body movement of the body part based on a tracking sensor. The external camera is configured to obtain a body image of the body part. The processor is configured to obtain a first moving track of a body moving track of the body part based on the body movement, obtain a second moving track of the body moving track of the body part based on the body image, and determine a body pose of the body part based on the first moving track and the second moving track.

In this disclosure, a wearable tracking method is provided. The wearable tracking method includes: obtaining, from a wearable device, a first moving track of a body moving track of a body part based on a body movement, wherein the wearable device is adapted to be worn on the body part of a user and the wearable device is configured to detect the body movement of the body part based on a tracking sensor; obtaining, from an external camera, a second moving track of the body moving track of the body part based on a body image, wherein the external camera is configured to obtain the body image of the body part; and determining, by a processor, a body pose of the body part based on the first moving track and the second moving track.

Based on the above, according to the wearable tracking system and the wearable tracking method, a tracking of a user is performed easily.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
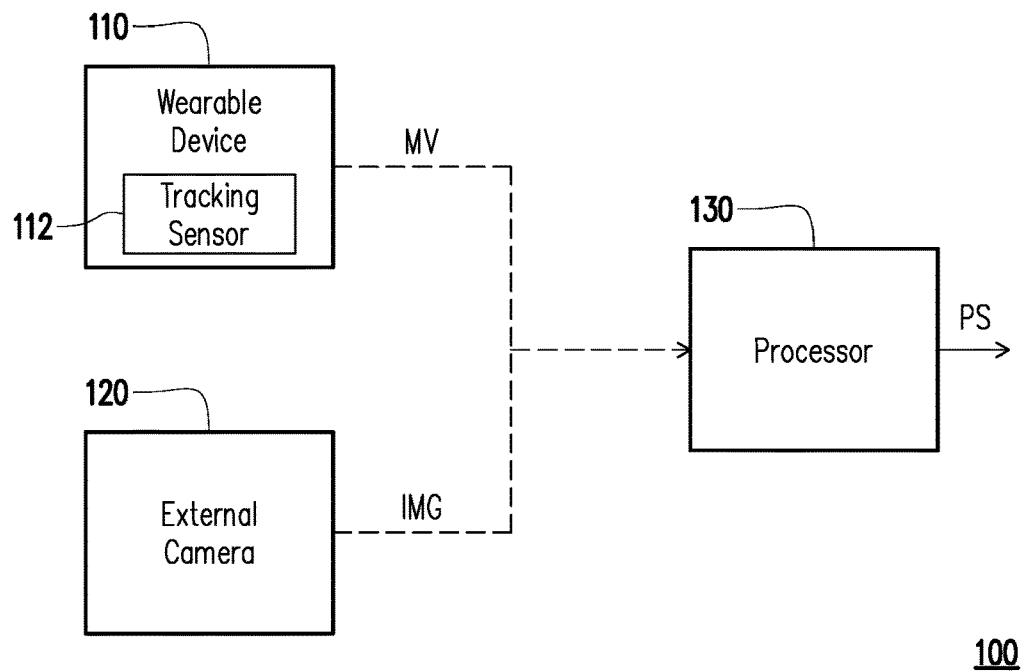
FIG. 1 is a schematic diagram of a wearable tracking system according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The term "coupling (or connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

It should be noted that in the following embodiments, the technical features of several different embodiments may be replaced, recombined, and mixed without departing from the spirit of the disclosure to complete other embodiments. As long as the features of each embodiment do not violate the spirit of the disclosure or conflict with each other, they may be mixed and used together arbitrarily.

In order to bring an immersive experience to user, technologies related to extended reality (XR), such as augmented reality (AR), virtual reality (VR), and mixed reality (MR) are constantly being developed. AR technology allows a user to bring virtual elements to the real world. VR technology allows a user to enter a whole new virtual world to experience a different life. MR technology merges the real world and the virtual.

To supply the immersive experiences, a wearable device worn by the user is often used for either providing immersive visual content or tracking a position of the user. Further, the wearable device may often collaborate with an external camera to improve the accuracy of the tracking of the position of the user. For example, the wearable device and the external camera may share a feature point map or make themselves trackable to each other. That is, the wearable device and the external camera may need to utilize a same algorithm or pre-store information of each other. In other words, it is often necessary to disposed trackers on the wearable device for the purpose of tracking the wearable device by the camera. Otherwise, the features or the shapes of the wearable device may be necessary to be pre-stored in the external camera for the purpose of tracking the wearable device by the camera. Therefore, the wearable device and the external camera are usually products of a same manufacturer.

However, while the wearable device and the external camera (that the user has) are products of different manufacturers or products utilizing different algorithms, the tracking might be failed or difficult to set up. Hence, how to develop a convenient tracking method utilizing products of different manufacturers is becoming an issue to work on.

FIG. 1 is a schematic diagram of a wearable tracking system according to an embodiment of the disclosure. With reference to FIG. 1, a wearable tracking system 100 may include a wearable device 110 and an external camera 120. The wearable device 110 is adapted to be worn on a body part of a user. Further, the wearable device 110 is configured to detect a body movement MV of the body part based on a tracking sensor 112. The external camera 120 is configured to obtain a body image IMG of the body part. The processor is configured to obtain a first moving track of a body moving track of the body part based on the body movement MV. Further, the processor is configured to obtain a second moving track of the body moving track of the body part based on the body image IMG. Furthermore, the processor is configured to determine a body pose PS of the body part based on the first moving track and the second moving track.

In this manner, since the wearable device 110 and the external camera 120 are configured to track a user based on a body moving track of a body part of the user, the wearable device 110 and the external camera 120 (that the user has) may be products of different manufacturers. For example, the wearable device 110 may be a first product of a first manufacturer and the external camera 120 may be a second product of a second manufacturer. Therefore, there is no need to consider the manufacturer of the wearable device 110 or the external camera 120, thereby increasing the convenience and the user experience. Further, there is no need to disposed markers on the wearable device 110 or pre-stored the information of the wearable device 110 in the external camera 120. That is, a marker-free calibration method between the wearable device 110 and the external camera 120 (from either a same manufacturer or different manufacturers) is achieved. Moreover, since the marker-free calibration method is easy to set up and no additional equipment is required. That is, re-calibration between the wearable device 110 and the external camera 120 may be performed anytime and an online calibration of the wearable tracking system 100 is achieved.

In one embodiment, the wearable device 110 may be a head-mounted display (HMD), wearable glasses (e.g., AR/VR goggles), a wristband device, a waistband device, a palm band device, a graspable device, other similar devices, or a combination of these devices. However, this disclosure is not limited thereto.

In one embodiment, the external camera 120 includes, for example, a complementary metal oxide semiconductor (CMOS) camera or a charge coupled device (CCD) camera. However, this disclosure is not limited thereto.

In one embodiment, the processor 130 includes, for example, a microcontroller unit (MCU), a central processing unit (CPU), a microprocessor, a digital signal processor (DSP), a programmable controller, a programmable logic device (PLD), other similar devices, or a combination of these devices. The disclosure is not limited thereto. In addition, in an embodiment, each of functions of the processor 130 may be achieved as multiple program codes. The program codes are stored in a memory, and executed by the processor 130. Alternatively, in an embodiment, each of the functions of the processor 130 may be achieved as one or more circuits. The disclosure does not limit the use of software or hardware to achieve the functions of the processor 130.

Further, the processor 130 may be integrated in the wearable device 110, in the external camera 120, in an extra device, or in a cloud server. However, this disclosure is not limited thereto. That is, this disclosure does not limit where the computation is performed in the wearable tracking system 100.

In one embodiment, the wearable device 110 may include a display module (not shown) and the display module includes, for example, an organic light-emitting diode (OLED) display device, a mini LED display device, a micro LED display device, a quantum dot (QD) LED display device, a liquid-crystal display (LCD) display device, a tiled display device, a foldable display device, or an electronic paper display (EPD). However, this disclosure is not limited thereto.

In one embodiment, the wearable device 110 or the external camera 120 may include a network module (not shown) and the network module includes, for example, a wired network module, a wireless network module, a Bluetooth module, an infrared module, a radio frequency identification (RFID) module, a Zigbee network module, or a near field communication (NFC) network module, but the disclosure is not limited thereto. That is, the wearable device 110 may be configured to communicate with the external camera 120 through either wired communication or wireless communication.

Figure 2A:
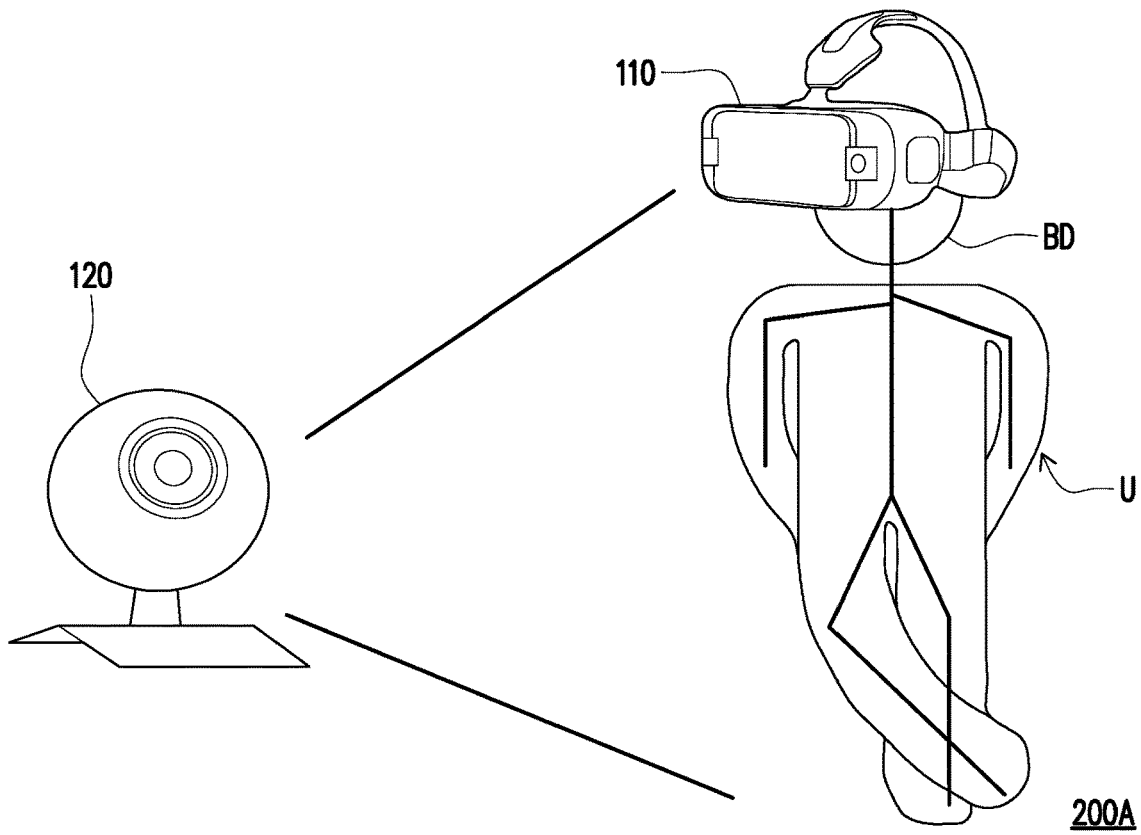
FIG. 2A is a schematic diagram of a tracking scenario of the wearable tracking system according to an embodiment of the disclosure.

FIG. 2A is a schematic diagram of a tracking scenario of the wearable tracking system according to an embodiment of the disclosure. With reference to FIG. 1 and FIG. 2A, a tracking scenario 200A depicts that the wearable device 110 may be worn on a body part BD of a user U and the external camera 120 may be disposed facing the user U to capture a photo (i.e., the body image IMG) of the user U. It is noted that, while it is depicted for the sake of convenience in explanation that the wearable device 110 may be worn on the head of the user U, the wearable device 110 may be also worn on other part of the user U.

In one embodiment, the wearable device 110 may be a head-mounted device and the body part BD of the user U may be a portion of the face (e.g., nose) or a head of the user U. In another embodiment, the wearable device 110 may be a wristband device and the body part BD of the user U may be a wrist of the user U. In yet another embodiment, the wearable device 110 may be a waistband device and the body part BD of the user U may be a waist of the user U. However, this disclosure is not limited thereto. That is, this disclosure does not limit the body BD where the wearable device 110 may be worn on. Further, a distance between the wearable device 110 and the body part BD may be different from one embodiment to another embodiment. Therefore, the processor 130 may be configured to a local transformation matrix for each embodiment to transform a coordinate of the wearable device 110 to a coordinate of the body part BD.

As described above, the wearable device 110 may include a tracking sensor 112 and the wearable device 110 may be configured to detect a body movement of the body part BD based on the tracking sensor 112.

In one embodiment, the tracking sensor 112 may include an internal camera (not shown), a light detection and ranging (LiDAR) device, a global positioning system (GPS) device, a radar, infrared sensor, an ultrasonic sensor, other similar devices, or a combination of these devices. The disclosure is not limited thereto. The tracking sensor 112 may be configured to obtain an environment image of an environment around the wearable device 110. Further, the processor 130 may be configured to generate a first moving track according to the environment image based on a simultaneous localization and mapping (SLAM) algorithm. That is, a SLAM map is generated according to the environment image based on the SLAM algorithm. In other words, the SLAM map may be obtained through a camera, a LiDAR device, a GPS device, a radar, infrared sensor, an ultrasonic sensor, other similar devices, or a combination of these devices. The disclosure is not limited thereto.

In one embodiment, the tracking sensor 112 may include an inertial measurement unit (IMU) sensor (not shown). The IMU sensor 112 may be configured to detect a linear acceleration or an angular velocity of the wearable device 110. Further, the processor 130 may be configured to generate a first moving track according to the linear acceleration or the angular velocity.

In one embodiment, the IMU sensor 112 includes, for example, a gyroscope, an accelerometer, other similar devices, or a combination of these devices. This disclosure is not limited thereto. In one embodiment, the IMU sensor 112 may be an accelerometer and may be configured to detect at least one of three linear acceleration values in three degrees of freedom (DOF). The three linear acceleration values may include a first acceleration value along an X axis, a second acceleration value along a Y axis, and a third acceleration value along a Z axis. In one embodiment, the IMU sensor 112 may be a gyroscope and may be configured to detect at least one of three angular velocities in three degrees of freedom. The three angular velocities may include a roll angular velocity about an X axis, a pitch angular velocity about a Y axis, and a yam angular velocity about a Z axis. In one embodiment, the IMU sensor 112 may include an accelerometer and a gyroscope and configured to detect changes in six degrees of freedom. The changes in the six degrees of freedom includes the three linear acceleration values corresponding to the three perpendicular axes and the three angular velocities corresponding to three perpendicular axes (e.g., X, Y, Z axes).

In one embodiment, the external camera 120 may be configured to obtain a body image IMG of the body part BD. Further, the processor 130 may be configured to generate a second moving track according to the body image IMG based on a simultaneous localization and mapping (SLAM) algorithm.

It is noted that, different technologies have been developed to track a movement of the user U. For example, there are two main categories of tracking technologies, which are inside-out tracking and outside-in tracking. The inside-out tracking is to track the movement in view of an internal device itself (e.g., the wearable device 110) relative to an outside environment. The outside-in tracking is to track the movement in view of an external device (e.g., the external camera 120), which is disposed separately from the internal device and configured to observe/track the movement of the internal device.

By utilizing the wearable tracking system 100, in response to the body part BD of the user U moving, a body moving track of the body part BD may be obtained by the wearable device 110 or the external camera 120. That is, the wearable device 110 provides an inside-out tracking function to the wearable tracking system 100 and the external camera 120 provides an outside-in tracking function to the wearable tracking system 100. In other words, the processor may be configured to obtain the first moving track based on an inside-out tracking algorithm and configured to obtain the second moving track based on an outside-in tracking algorithm.

In this manner, since the wearable device 110 and the external camera 120 are configured to track the user U based on a body moving track of a body part BD of the user U, there is no need to consider the manufacturer of the wearable device 110 or the external camera 120, thereby increasing the convenience and the user experience.

Figure 2B:
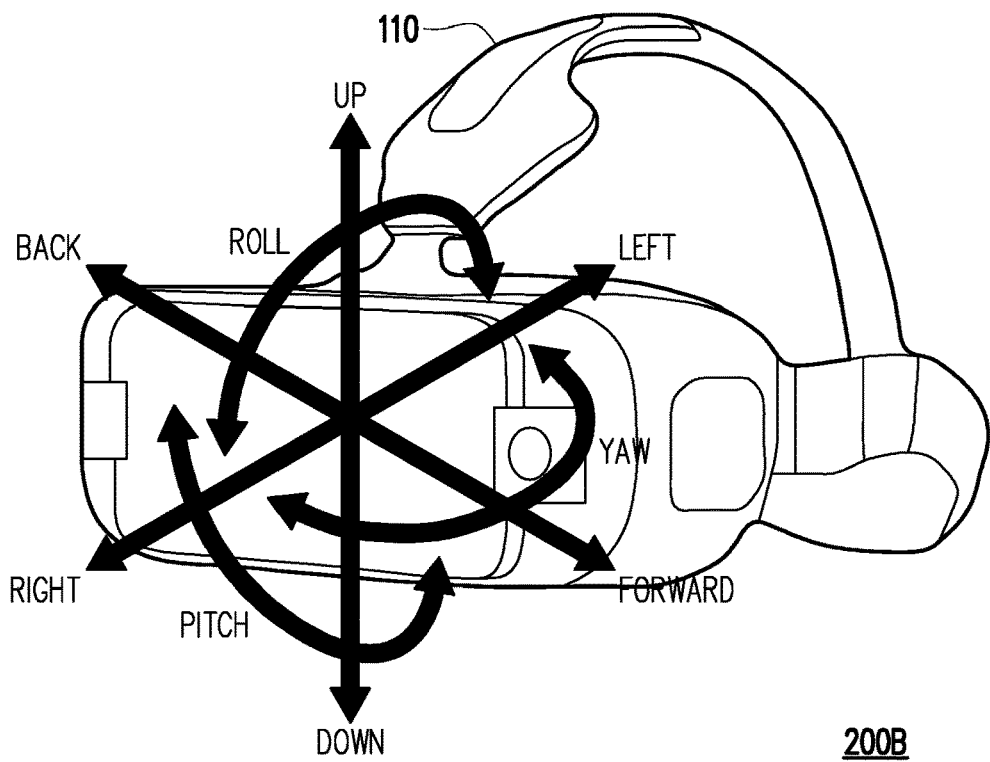
FIG. 2B is a schematic diagram of a first moving track according to an embodiment of the disclosure.
Figure 2C:
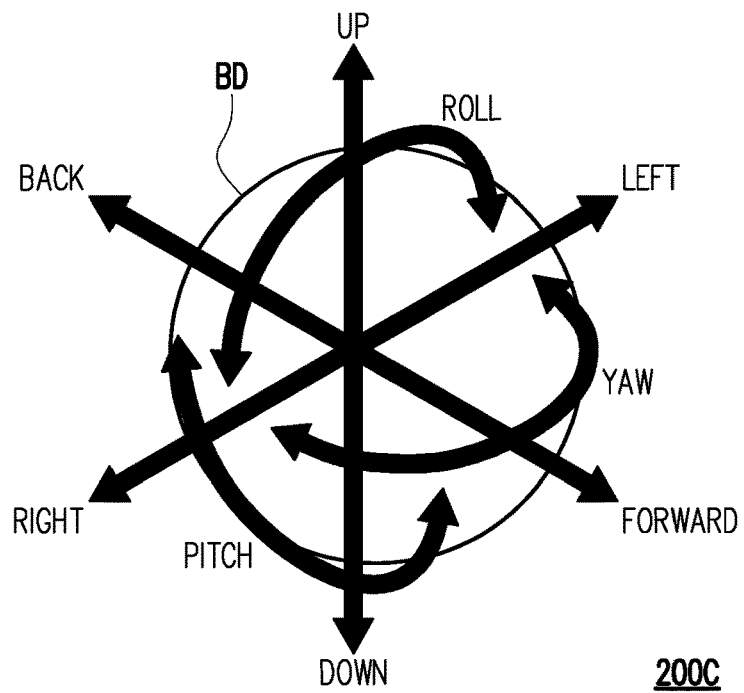
FIG. 2C is a schematic diagram of a second moving track according to an embodiment of the disclosure.
Figure 2D:
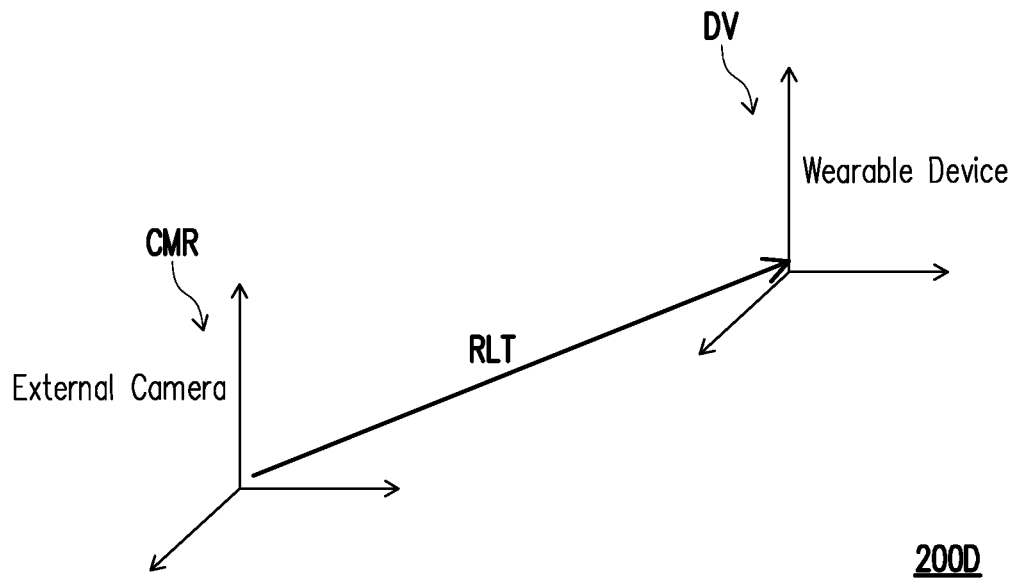
FIG. 2D is a schematic diagram of a coordinate transformation relationship between a wearable device and an external camera according to an embodiment of the disclosure.

FIG. 2B is a schematic diagram of a first moving track according to an embodiment of the disclosure. FIG. 2C is a schematic diagram of a second moving track according to an embodiment of the disclosure. FIG. 2D is a schematic diagram of a coordinate transformation relationship between a wearable device and an external camera according to an embodiment of the disclosure. With reference to FIG. 1 to FIG. 2D, FIG. 2B depicts a first moving track of the body part BD of the user U is tracked (obtained) based on the wearable device 110 and FIG. 2C depicts a second moving track of the body part BD of the user U is tracked (obtained) based on the external camera 120.

For example, the user U may use the body part BD to draw a circle (i.e., the body moving track) in the environment. The wearable device 110 may obtain (record/track) the circle through detecting the body movement MV based on the tracking sensor 112. The external camera 120 may obtain (record/track) the circle through capturing the body image IMG. Further, the processor 130 may obtain the first moving track based on the body movement MV and may obtain the second moving track based on the body image IMG. The first moving track and the second moving track may have similar or identical size and shape as the circle drawn by the user U. That is, each of the first moving track and the second moving track may be also a circle. Therefore, by comparing the first moving track with the second moving track by the processor 130, a coordinate transformation relationship RLT between the wearable device 110 and the external camera 120 may be generated. Hence, a body pose PS may be determined by the processor 130 based on the coordinate transformation relationship RLT.

In one embodiment, a coordinate transformation relationship RLT between the wearable device 110 and the external camera 120 may be depict as FIG. 2D. A coordinate system DV of the wearable device 110 may be defined as an outside-in coordinate system and a coordinate system CMR of the external camera 120 may be defined as an inside-out coordinate system.

After the first moving track based on the wearable device 110 and the second moving track based on the external camera 120 are obtained, the processor 130 may be configured to align the first moving track with the second moving track. For example, the first moving track and the second moving track are both circles. The first moving track may be also known as a first circle and the second moving track may be also known as a second circle. The processor 130 may be configured to move the position of the first circle and/or rotate the first circle to align (fit) with the second circle. That is, the processor 130 may be configured to calculate a position transformation matrix between the inside-out coordinate system of the first circle (i.e., the first moving track) and an outside-in coordinate system of the second circle (i.e., the second moving track). Further, the processor 130 may be configured to calculate a rotation transformation matrix between the inside-out coordinate system of the first circle (i.e., the first moving track) and the outside-in coordinate system of the second circle (i.e., the second moving track). Thus, the coordinate transformation relationship RLT may be determined according to the position transformation matrix and/or the rotation transformation matrix. For example, a calibration matrix (e.g., the position transformation matrix or the rotation transformation matrix) may be solved using standard linear least-squares based on the first moving track and the second moving tracking. However, this disclosure is not limited thereto.

Therefore, once the coordinate transformation relationship RLT is determined, a first coordinate in the outside-in coordinate system may be transform to a second coordinate in the inside-out coordinate system. That is, a first tracking result of the user U based on the wearable device 110 may be fused with a second tracking result of the user U based on the external camera 120. Hence, the body pose PS may be determined according on a fusion result of the first tracking result and the second tracking result. In other words, the processor 130 may be configured to determine the body pose PS based on the position transformation matrix and the rotation transformation matrix.

In this manner, since the wearable device 110 and the external camera 120 are configured to track the user U based on a body moving track of the body part BD of the user U, there is no need to consider the manufacturer of the wearable device 110 or the external camera 120, thereby increasing the convenience and the user experience.

Figure 3:
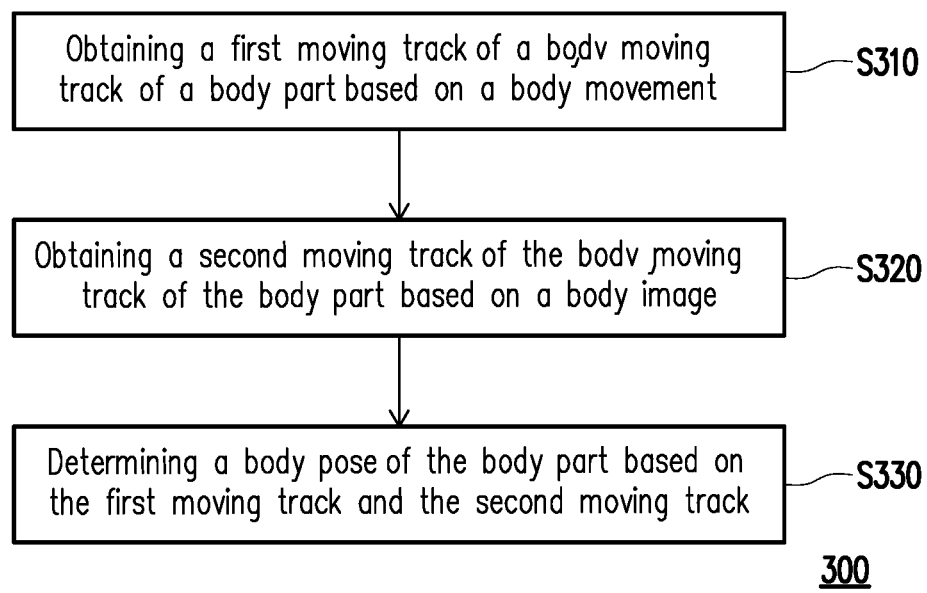
FIG. 3 is a schematic flowchart of a wearable tracking method according to an embodiment of the disclosure.

FIG. 3 is a schematic flowchart of a wearable tracking method according to an embodiment of the disclosure. With reference to FIG. 1 to FIG. 3, a wearable tracking method 300 may include a step S310, a step S320, and a step S330.

In the step S310, a first moving track of a body moving track of a body part BD of a user U may be obtained, by the processor 130, based on a body movement MV detected by the wearable device 110. In the step S320, a second moving track of the body moving track of the body part BD of the user U may be obtained, by the processor 130, based on a body image IMG obtained by the external camera 120. In the step S330, a body pose PS may be determined, by the processor 130, based on the first moving track and the second moving track. It is noted that, the implementation details of the wearable tracking method 300 may be referred to the descriptions of FIG. 1 to FIG. 2D to obtain sufficient teachings, suggestions, and implementation embodiments, while the details are not redundantly described seriatim herein.

In this manner, since the wearable tracking method 300 is configured to track the user U based on the body moving track of the body part BD of the user U, there is no need to consider the manufacturer of the wearable device 110 or the external camera 120, thereby increasing the convenience and the user experience.

In summary, according to the wearable tracking system 100 and wearable tracking method 300, since the wearable device 110 and the external camera 120 are configured to track the user U based on a body moving track of a body part BD of the user U, there is no need to consider the manufacturer of the wearable device 110 or the external camera 120, thereby increasing the convenience and the user experience.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A wearable tracking system, comprising:

a wearable device, adapted to be worn on a body part of a user, wherein the wearable device is configured to detect a body movement of the body part based on a tracking sensor;

an external camera, disposed away from the user and configured to obtain a body image of the body part; and a processor, configured to:

obtain a first moving track of the body part based on the body movement and an inside-out tracking algorithm, wherein the first moving track is configured to represent a body moving track of the body part based on the tracking sensor;

obtain a second moving track of the body part based on the body image and an outside-in tracking algorithm, wherein the second moving track is configured to represent the body moving track of the body part based on the external camera; and determine a body pose of the body part based on the first moving track and the second moving track.

2. The wearable tracking system according to claim 1, wherein the processor is further configured to:

generate a coordinate transformation relationship between the wearable device and the external camera by comparing the first moving track with the second moving track; and determine the body pose based on the coordinate transformation relationship.

3. The wearable tracking system according to claim 1, wherein the processor is further configured to:
  align the first moving track with the second moving track;
  calculate a position transformation matrix between the an inside-out coordinate system of the first moving track and an outside-in coordinate system of the second moving track;
  calculate a rotation transformation matrix between the inside-out coordinate system of the first moving track and the outside-in coordinate system of the second moving track; and
  determine the body pose based on the position transformation matrix and the rotation transformation matrix.

4. The wearable tracking system according to claim 1, wherein the tracking sensor comprises:
  an internal camera, configured to obtain an environment image of an environment around the wearable device,
  wherein the processor is configured to generate the first moving track according to the environment image based on a simultaneous localization and mapping algorithm.

5. The wearable tracking system according to claim 1, wherein the tracking sensor comprises:
  an inertial measurement unit sensor, configured to detect a linear acceleration or an angular velocity of the wearable device,
  wherein the processor is configured to generate the first moving track according to the linear acceleration or the angular velocity.

6. The wearable tracking system according to claim 1, wherein the processor is configured to generate the second moving track according to the body image based on a simultaneous localization and mapping algorithm.

7. The wearable tracking system according to claim 1, wherein the wearable device is a head-mounted device and the body part is a portion of a face or a head of the user.

8. The wearable tracking system according to claim 1, wherein the wearable device is a wristband device and the body part is a wrist of the user.

9. The wearable tracking system according to claim 1, wherein the wearable device is a waistband device and the body part is a waist of the user.

10. The wearable tracking system according to claim 1, wherein the wearable device is a first product of a first manufacturer and the external camera is a second product of a second manufacturer.

11. A wearable tracking method, comprising:
  obtaining, from a wearable device, a first moving track of a body part based on a body movement and an inside-out tracking algorithm, wherein the wearable device is adapted to be worn on the body part of a user, the wearable device is configured to detect the body movement of the body part based on a tracking sensor, and the first moving track is configured to represent a body moving track of the body part based on the tracking sensor;
  obtaining, from an external camera, a second moving track of the body part based on a body image and an outside-in tracking algorithm, wherein the external camera is disposed away from the user and is configured to obtain the body image of the body part and the second moving track is configured to represent the body moving track of the body part based on the external camera; and
  determining, by a processor, a body pose of the body part based on the first moving track and the second moving track.

12. The wearable tracking method according to claim 11, further comprising:
  generating a coordinate transformation relationship between the wearable device and the external camera by comparing the first moving track with the second moving track; and
  determining the body pose based on the coordinate transformation relationship.

13. The wearable tracking method according to claim 11, further comprising:
  aligning the first moving track with the second moving track;
  calculating a position transformation matrix between the an inside-out coordinate system of the first moving track and an outside-in coordinate system of the second moving track;
  calculating a rotation transformation matrix between the inside-out coordinate system of the first moving track and the outside-in coordinate system of the second moving track; and
  determining the body pose based on the position transformation matrix and the rotation transformation matrix.

14. The wearable tracking method according to claim 11, wherein the tracking sensor comprises an internal camera, configured to obtain an environment image of an environment around the wearable device, wherein the wearable tracking method further comprises:
  generating the first moving track according to the environment image based on a simultaneous localization and mapping algorithm.

15. The wearable tracking method according to claim 11, wherein the tracking sensor comprises an inertial measurement unit sensor, configured to detect a linear acceleration or an angular velocity of the wearable device, wherein the wearable tracking method further comprises:
  generating the first moving track according to the linear acceleration or the angular velocity.

16. The wearable tracking method according to claim 11, further comprising:
  generating the second moving track according to the body image based on a simultaneous localization and mapping algorithm.

17. The wearable tracking method according to claim 11, wherein the wearable device is a head-mounted device and the body part is a portion of a face or a head of the user.

18. The wearable tracking method according to claim 11, wherein the wearable device is a first product of a first manufacturer and the external camera is a second product of a second manufacturer.

* * * * *